United States Patent
Reichel

(10) Patent No.: US 8,494,679 B2
(45) Date of Patent: Jul. 23, 2013

(54) CONTROL OF THE CONVERTER PROCESS BY MEANS OF EXHAUST GAS SIGNALS

(75) Inventor: Johann Reichel, Düsseldorf (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 13/519,088

(22) PCT Filed: Dec. 14, 2010

(86) PCT No.: PCT/EP2010/069599
§ 371 (c)(1),
(2), (4) Date: Sep. 21, 2012

(87) PCT Pub. No.: WO2011/076615
PCT Pub. Date: Jun. 30, 2011

(65) Prior Publication Data
US 2013/0018508 A1    Jan. 17, 2013

(30) Foreign Application Priority Data

Dec. 23, 2009 (DE) .......................... 10 2009 060 258

(51) Int. Cl.
*G05B 21/00* (2006.01)
(52) U.S. Cl.
USPC ........... 700/274; 700/266; 266/144; 266/217; 266/200
(58) Field of Classification Search
USPC .................... 700/266, 274; 266/144, 217, 200
See application file for complete search history.

(56) References Cited

U.S. PATENT DOCUMENTS 4,148,629 A * 4/1979 Kammerhofer ................. 75/379
4,251,270 A 2/1981 Hoshi et al.
(Continued)

FOREIGN PATENT DOCUMENTS

DE 2836694 3/1979
DE 2839316 A 3/1979
(Continued)

OTHER PUBLICATIONS

STAHL_UND_EISEN_Jun. 14, 1993

*Primary Examiner* — Brian R Gordon
*Assistant Examiner* — Shogo Sasaki
(74) *Attorney, Agent, or Firm* — Lucas & Mercanti, LLP; Klaus P. Stoffel

(57) ABSTRACT

Modern steel production processes require precise knowledge of the current composition and temperature of the liquid metal being processed. In particular during steel production in a converter, high match rates for final carbon content and bath temperature are required. Quantitatively precise blowing of oxygen corresponding to the final target carbon content, and the metal temperature, are decisive factors affecting the economic efficiency of the process and the quality of the steel produced. In order to allow relatively precise process monitoring, various processes and procedures are known, the application thereof being based on measuring exhaust gas composition and on mass flow balances. All models work at an exactness that depends on the precision of the input data, particularly with respect to the weight data of the raw materials and the chemical properties of the metal used. In order to allow control of the converter process for producing steel independently of the predefined process model, in particular when blowing oxygen, the invention proposes that detected values for the critical decoking point ($t'_{crit}$) and for the end of $O_2$-blowing ($t'_{EoB}$) are obtained by means of a submodel operating as a process monitor based on the exhaust gas analysis and independent of the process model, by sensibly combining the constituent signals obtained, by means of which values the oxygen content predicted by the process model is corrected at the start of the process and matched to the actual conditions near the end of the decoking period.

6 Claims, 1 Drawing Sheet

| U.S. PATENT DOCUMENTS | | | |
|---|---|---|---|
| 4,416,691 A | | 11/1983 | Narita et al. |
| 6,093,235 A | * | 7/2000 | Reichel .......................... 75/585 |
| 6,190,435 B1 | * | 2/2001 | Miyamoto et al. .............. 75/511 |
| 6,468,467 B1 | * | 10/2002 | Miyamoto et al. ............ 266/209 |
| 6,805,724 B2 | * | 10/2004 | Shver ............................. 75/10.4 |
| 8,092,572 B2 | | 1/2012 | Matschullat |
| 2010/0192672 A1 | | 8/2010 | Reichel |

| FOREIGN PATENT DOCUMENTS | | |
|---|---|---|
| EP | 0572848 X Y | 12/1993 |
| GB | 2003929 | 3/1979 |
| JP | 1079314 | 3/1989 |
| WO | 2008049673 | 5/2008 |
| WO | 2009030192 | 3/2009 |

* cited by examiner

CONTROL OF THE CONVERTER PROCESS BY MEANS OF EXHAUST GAS SIGNALS

The present application is a 371 of International application PCT/EP2010/069599, filed Dec. 14, 2010, which claims priority of DE 10 2009 060 258.5, filed Dec. 23, 2009, the priority of these applications is hereby claimed and these applications are incorporated herein by reference.

BACKGROUND OF THE INVENTION

The invention concerns a method for the dynamic control of the converter process, especially during the blowing of oxygen in steelmaking by means of exhaust as analyses.

Modern steelmaking processes require exact knowledge of the current composition and temperature of the liquid metal being processed. Especially during steelmaking in a converter, high match rates for the final carbon content and the bath temperature are necessary. Quantitatively precise blowing of oxygen corresponding to the final target carbon content and the metal temperature are decisive factors affecting the economy of the process and the quality of the steel produced.

In order to realize relatively precise process monitoring, various procedures and processes are known, whose application is based in most cases on mass flow balances and the measurement of exhaust gas composition. All models work with a precision that depends on the exactness of the input data, especially with respect to the weight data of the raw materials and the chemical properties of the metal that is being used.

DE 28 39 316 A1 discloses a method for controlling a steelmaking process, in which the decarburization of the molten steel takes place under atmospheric pressure and with the formation of an exhaust gas containing CO, $CO_2$, and $N_2$. This method has the following steps: the formation of an intimate gas mixture from the exhaust gas and a measured quantity of a reference gas that is inert relative to the exhaust gas, mass spectrometric monitoring of a sample of the intimate mixture for the ionization currents for selected peaks related to the CO, $CO_2$, $N_2$, and reference gas in the sample, determination of the rate or amount of decarburization of the molten steel at the time of the monitoring from the measured value of the quantity of reference gas in the mixture and the measured values of the ionization currents for the selected peaks, and control of the steelmaking process according to the determined value of the rate or amount of decarburization of the molten steel.

WO 2008/049673 A1 describes a method for automatically controlling the CO output of the steelmaking process, in which oxygen ($O_2$) is introduced into the melt to remove the carbon (C) present in the steel, the actual value of the carbon stream escaping from the melt is determined, a desired value for the escaping carbon stream is calculated on the basis of the amount of oxygen supplied and the carbon content of the melt, taking in account any other reactions, the desired value and the actual value are compared, and if the actual value is lagging behind the desired value, measures are undertaken to prevent the abrupt rising of gas bubbles. The following are specified as suitable measures:

control of the oxygen supply to the melt and possible reduction of the oxygen supply,
supplying carbon to the melt.

WO 2009/030192 A1 discloses a method for indirect determination of the exhaust gas rate in metallurgical processes. This method is characterized in that first a reference gas, such as helium, is added to the exhaust gas, specifically, at a point in time which precedes the taking of a sample to a sufficient extent, with respect to flow, that the reference gas and the exhaust gas have become thoroughly mixed, i.e., a virtually homogeneous distribution has been achieved, and that then a quantitative helium and nitrogen analysis is undertaken, measured with a mass spectrometer, taking into account the amount of helium added, with the following individual determinations: $O_2$, CO, $CO_2$, $N_2$, Ar, He, $H_2$.

As explained in a paper in "Stahl and Eisen 113 (1993), No, 6, p. 56," more than 20 years ago engineers began using the information about the decarburization process in the LD converter that is contained in the exhaust gas. For 9 of 17 basic oxygen steelmaking plants named in a review through 1980, an exhaust gas measurement was specified for process control of oxygen converter processes and an increased setpoint setting accuracy of 85% to 95% was given for a range of carbon content of ±0.020%. This corresponds to a standard deviation of the error of about 0.014% to 0.010%. In the meantime, exhaust gas measurement has become, as will be explained further—partly with mass spectrometer, partly with individual instruments—a permanent part of most process control systems for LD converters and the oxygen steelmaking processes derived from them. In supplementation of the so-called "static model" for precalculating the process, the exhaust gas measurement, together with the sublance, makes possible the continuous observation and control of the process in a so-called "dynamic model." The decreasing decarburization rate before the end of treatment indicates when a sublance measurement is to be performed in order to reliably hit not only the target carbon content but also the target temperature with this position determination. The calculation of the slagging of iron, manganese, phosphorus and sulfur on the basis of the oxygen balance can determine the bath composition so exactly that most melts can be directly tapped and alloyed without taking a control sample and awaiting its analysis.

SUMMARY OF THE INVENTION

Proceeding from the prior art described above, the objective of the invention is to specify a process which allows dynamic control of the converter process for steelmaking, especially during the blowing of oxygen, with said dynamic control being independent of the specified process model.

This objective is achieved by a method with the aid of a submodel that is independent of the process model and that operates as a process monitor based on exhaust gas analysis, a suitable combination of the constituent signals obtained is used to compute determined values for the critical decarburization time ($t'_{crit}$) and for the end of $O_2$ blowing ($t'_{EoB}$), by which the oxygen content predicted by the process model is corrected at the beginning of the process and adjusted to the actual conditions towards the end of the decarburization period, where the critical decarburization time ($t'_{crit}$) is calculated by:

$$t = t'_{crit} \text{ if } CP(t) \geq CPP \text{ and } CP(t) = (N_2)\hat{\ }n/(CO)\hat{\ }m$$

wherein
CCP=limit parameter,
$CP=(N_2)\hat{\ }n/(CO)\hat{\ }m$ for converters with a gap and low CO post-combustion,
$CP=(N_2/CO_2)\hat{\ }s$ for converters without a gap and high CO post-combustion, and the end of $O_2$ blowing ($t'_{EoB}$) is computed by:

$$t = t'_{EoB} \text{ if } EoB(t) \geq EoBP1 \text{ and } EoB = (CO + CO_2) - rPC$$

wherein $PC = CO_2/(CO + CO_2)100 = \text{post-combustion in \%}$ with

CO: carbon monoxide content of the exhaust gas in %
$CO_2$: carbon dioxide content of the exhaust gas in %
and
EoBP1=limit parameter
r=adjustment parameter.

The end of oxygen blowing corresponds to the time at which the gradient of the function "EoB" exceeds a well-defined valence. The constant "r" amplifies the signal and increases the signal sensitivity. The physical configuration of this amplified signal means an end of the CO post-combustion in the converter vessel.

The parameters in the equations for the critical decarburization time and for the end of $O_2$ blowing depend on the converter design and especially on the availability of gap adjustment and need to be adjusted at regular intervals. Expected adjustment ranges are:

n=6-7
m=3-6
s=3-4
r=0-5.

The critical decarburization time corresponds to that time at which the gradient of the function "CP" exceeds a well-defined valence, i.e., the decarburization kinetics change from the state of an oxygen deficit for carbon oxidation to a state of oxygen excess. The physical configuration of this amplified signal means the beginning of reduced decarburization, expressed by a continuous rise in the nitrogen concentration and a drop in the carbon monoxide concentration of the exhaust gas. The state before this time characterizes the virtually constant decarburization rate of the main decarburization phase and is directly proportional to the quantity of blown oxygen. After the critical decarburization time, the decarburization rate is controlled by a reaction potential, which is expressed by a difference between the current carbon concentration and its thermodynamic equilibrium. This decarburization rate exhibits an exponential trend. The reduced decarburization rate leads to a lower reaction potential as a function of the difference between the current carbon concentration and its thermodynamic equilibrium. This involves a function of the current chemical composition of the metal and its temperature. Exponents of the function amplify the signal and increase the signal sensitivity in all signal changes.

For converters with a gap and low CO post-combustion, the gradient of the function "CP" is:

$CP = (N_2)^n / (CO)^m$ with
$N_2$=the nitrogen concentration of the exhaust gas in %.
in the case of nonavailability, $N_2$ can be calculated as $N_2 = 100 - O_2 - CO - CO_2$ and for converters without a gap and high CO post-combustion:

$CP = (N_2/CO_2)^s$

A supporting calculation makes it possible to determine, as a function of the different signal levels of the exhaust gas analysis, the captured carbon content in the metal bath, in which a certain desired final carbon concentration can be achieved by stopping the oxygen blowing. In addition, by combining the critical decarburization time with the end of $O_2$ blowing, a definition is obtained of the time interval assigned to a carbon concentration in the metal bath after the critical decarburization time.

The method can be assigned the following procedure:
If t=t'crit $t: t'\text{crit} + \Delta t \rightarrow C_j(t'\text{crit} + \Delta t)$ $t: t'\text{crit} + 2\Delta t \rightarrow C_j(t'\text{crit} + 2\Delta t)$ $t: t'\text{crit} + n\Delta t \rightarrow C_j(t'\text{crit} + n\Delta t)$ wherein
$\Delta t = (t_f - t'\text{crit})/n$=time interval to be statistically analyzed.

Finally, a supporting calculation of the remaining decarburization time on the basis of the critical carbon concentration is used to obtain an estimate of the remaining oxygen to be blown.

The measurement system used for the method of the invention should be based on at least the three fundamental exhaust gas constituents; oxygen, carbon monoxide and carbon dioxide, with nitrogen and residual gas components completing the gas balance. In a conventional measurement, nitrogen is calculated as the remainder up to 100%; hydrogen and all other components are neglected. When a mass spectrometer is used, all significant components of the exhaust gas become available directly from the measurement. Empirical quantities, which are expressed in analytic functions as specific combinations of the components, track as well-defined deciding factors the behavior of the different trends that are significant for the determination of the critical decarburization time and the end of blowing.

The roughly measured values of quantity and composition of the exhaust gas, which are received from the corresponding instruments of the measurement system that is used, must be partially processed before they are used in balancing calculations to smooth the signal fluctuations, to make sure of the correct relation of the various data points to the corresponding point in time, and to apply some quantitative correction parameters.

The smoothing of the signal fluctuations involves a customary mathematical method that is used with several quantities. For completeness of the parameter relations, the smoothing is given in the following formulas. A smoothing operator $\bar{X}$=smooth($X, \tau$) is introduced as abbreviated notation by definition of the expression as:

$$x(k+1) = \frac{x(k)\tau + u(k)\Delta t}{\tau + \Delta t}$$

wherein
u(k)=an unfiltered series of measured values of a signal in time t with time intervals of $\Delta t$, typically a sequence of measured values,
x(k+1)=the corresponding smoothed signal,
$\tau$=an average time interval parameter which determines the degree of smoothing.

In the case of a double smoothing, in which the smoothing procedure is performed twice, the notation is $\bar{X}$=smooth$^2(X, \tau)$.

The exhaust gas measurement system usually yields signals with a scanning time of 0.3-0.5 seconds. These signals serve to form different specific support signals and control signals. The following filtering method can be used to smooth them:

$x(k+1) = a\,x(k) + (1-a)u(k),$ where k=0, 1, 2
wherein
x(k)=smoothed signal "x" at time k
x(k+1)=smoothed signal "x" at time k+1
u(k)=measured signal "x" at time k and with the parameters $$a = N/(N+1)a\epsilon*[0,1]$$

$$1-a = 1/(N+1)$$

wherein

N=the number of signal values scanned during the smoothing procedure.

Due to the delay on the order of 15-20 seconds of the exhaust gas values determined at an interval of one second at a scanning time of 0.3-0.5 seconds, the exhaust gas values must be statistically analyzed for the determination of the critical decarburization time and the time of the end of blowing and their difference.

The method of the invention is characterized by the following coordinated operating procedure:

(A) Process model with statistical process computation and definition of:
  $O_2$ quantity, blowing model, type of flushing gas, flushing gas model, lance separation
  addition of fluxes
  addition of coolants.

(B) Submodel, independent of the process model, with dynamic process monitoring of
  exhaust gas model (PC, CP, EoB)
  CP=critical decarburization time
  EOB=end of blowing time

BRIEF DESCRIPTION OF THE DRAWING

The design of an exhaust gas measurement system (FIG. 1) is described below with reference to specific embodiments.

DETAILED DESCRIPTION OF THE INVENTION

Figure 1:
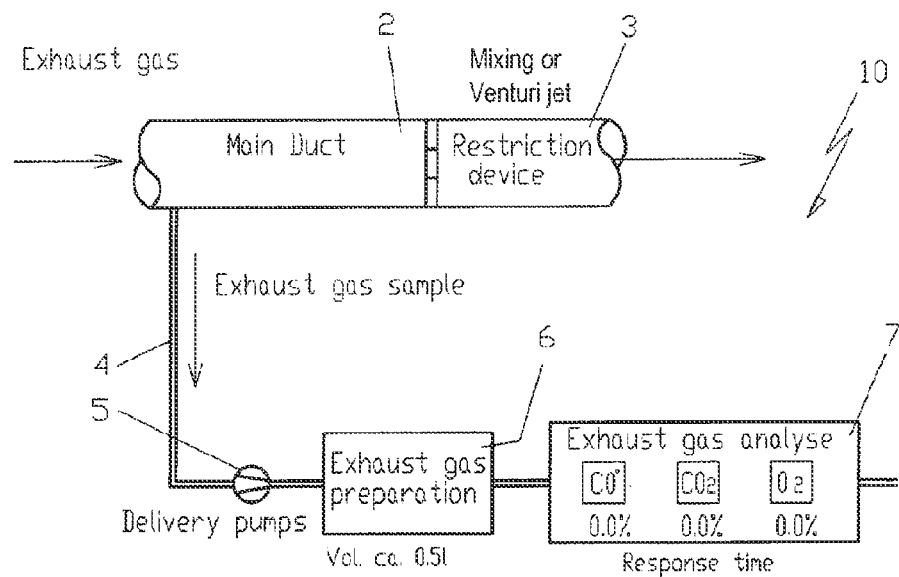

FIG. 1 is a flow diagram of a conventional measurement system 10 with series-connected (parallel connection is also possible) analytical instruments 7 for the determination of CO, $CO_2$, and $O_2$. An exhaust gas sample 4 of about (15 liters is taken from the exhaust gas of the converter 1 (FIG. 2) upstream of a restrictor or venturi tube 3 in the exhaust gas line 2 by means of a suction pump 5 and delivered to an exhaust gas preparation unit 6, from which it then successively enters the analytical instruments 7 connected in series, in which a signal corresponding to the analytical value is generated with a response time of 0.5 seconds each.

Figure 2:
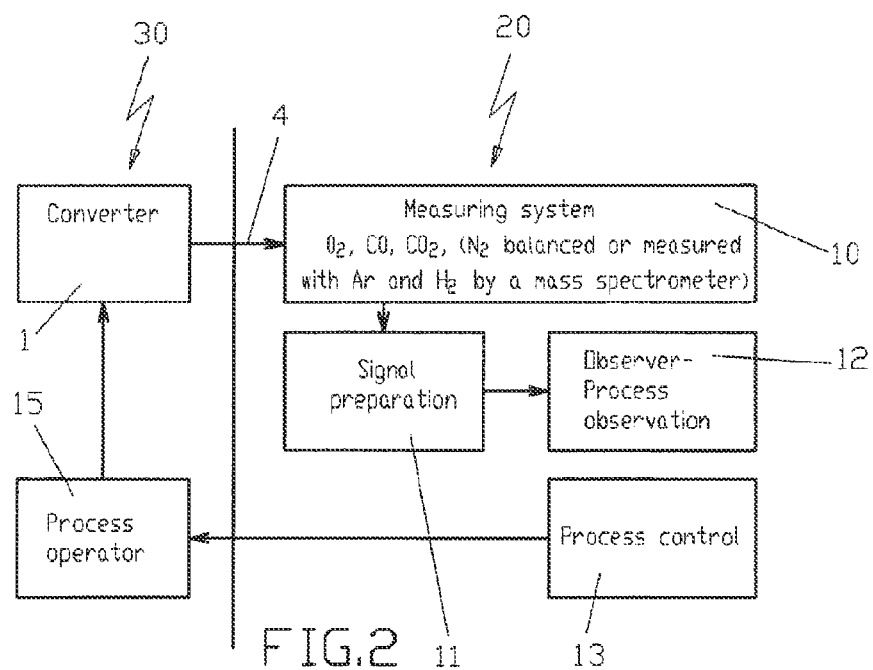
FIG. 2 provides an overview of the closed-loop control system of a converter in accordance with the invention.

FIG. 2 is a schematic representation of the closed-loop control system for a converter 1. The closed-loop control system consists of the sections of process monitoring and management 20 in accordance with the invention (on the right side in the drawing) with the measurement system 10, signal processing unit 11, submodel as process monitor 12, and process control 13, and the conventional process procedure 30 (on the left side in the drawing) with converter 1 and process control and operation 15.

The exhaust gas samples 4 of the converter 1 are analyzed in the measurement system 10 (see FIG. 1), and the signals thus obtained, which correspond to the analytical values, are processed in the signal processing unit 11 in such a way that the data correcting the original process model flow from the submodel 12 into the process control and management unit 13 for process control and operation 15.

| List of Reference Numbers | |
|---|---|
| 1 | converter |
| 2 | exhaust gas line from the converter |
| 3 | restrictor or venturi tube |
| 4 | exhaust gas sample |
| 5 | suction pump |
| 6 | exhaust gas preparation unit |
| 7 | analytical instruments |
| 10 | measurement system |
| 11 | signal processing |
| 12 | submodel as process monitor |
| 13 | process control |
| 15 | process control |
| 20 | process monitoring and management |
| 30 | process procedure |

The invention claimed is:

1. A method for dynamic control of a converter process during blowing of oxygen in steelmaking by way of exhaust gas analyses, with the aid of a process model with static process computation and with the aid of a submodel with dynamic process monitoring that is independent of the process model and that operates as a process monitor based on exhaust gas analysis, the method comprising the steps of:

in a closed-loop control system that comprises a process monitoring and management unit with a measurement system, signal processing unit, the submodel as process monitor, and a process control or process management unit, as well as a process procedure with converter and process control or process operation;

predicting oxygen content for blowing using the process model with static process computation;

analyzing exhaust gas samples of the converter in the measurement system to determine analytical values of $O_2$, CO, $CO_2$ and $N_2$ in the exhaust gas, using the submodel with dynamic process monitoring;

obtaining signals representing said analytical values;

processing said signals thus obtained, which correspond to the analytical values, in the signal processing unit; and then data correcting said process model with static process computation flow from the submodel into the process control or management unit for process control or process operation;

wherein, with the aid of the submodel that is independent of the process model, the data correcting comprises: using a suitable combination of the constituent signals obtained, and computing values for critical decarburization time (t) and for an end of $O_2$ blowing ($t'_{EoB}$);

wherein the oxygen content predicted by the process model is corrected at a beginning of the process and adjusted to actual conditions towards an end of the decarburization period, where the critical decarburization time ($t'_{crit}$) is expressed by:

$$t = t'_{crit} \text{ if } CP(t) \geq CPP \text{ and } CP(t) = (N_2)^n/(CO)^m$$

wherein CCP=predetermined limit parameter,
$CP=(N_2)^n/(CO)^m$ for converters with a gap and low CO post-combustion,
$CP=(N_2/CO_2)$ s for converters without a gap and high CO post-combustion,
and the end of $O_2$ blowing ($t'_{EoB}$) is expressed by:

$$t = t'_{EoB} \text{ if } EoB(t) \geq EoBP1 \text{ and } EoB = (CO+CO_2) - rPC$$

wherein
post-combustion in %=PC=$CO_2/(CO+CO_2)100$
and EoBP1=predetermined limit parameter, and the parameters in the equations for the critical decarburization time and for the end of $O_2$ blowing depend on the converter design and on the availability of gap adjustment and need to be adjusted at regular intervals.

2. The method in accordance with claim 1, wherein the adjustment ranges are n=6-7; m=3-6; s=3-4; r=0-5.

3. The method in accordance with claim 1, including using a supporting calculation to determine, as a function of different signal levels of the exhaust gas analysis, a captured carbon content in a metal bath, in which a certain desired final carbon concentration is achieved by stopping the oxygen blowing, where, by combining the critical decarburization time with the end of $O_2$ blowing, a definition is obtained of the time interval assigned to a carbon concentration in a metal bath after the critical decarburization time.

4. The method in accordance with claim 1, including using a supporting calculation of remaining decarburization time based on critical carbon concentration to obtain an estimate of remaining oxygen to be blown.

5. The method in accordance with claim 1, wherein roughly measured values of the exhaust gas analysis, which are received from corresponding instruments, are partially processed before being used in balancing calculations to smooth signal fluctuations of the measured quantity and composition of the exhaust gas, in order to obtain a correct relation of various data points for a certain point in time and to obtain quantitative correction parameters, where a smoothing operator X=smooth(X,τ) is introduced as abbreviated notation and the following formulas are used:

$$\text{smoothing operator } x(k+1) = \frac{x(k)\tau + u(k)\Delta t}{\tau + \Delta t}$$

or in case of a double smoothing, in which a smoothing procedure is performed twice:

$$X = \text{smooth}^2(X, \tau),$$

wherein
 u(k)=an unfiltered series of measured values of a signal in time t with time intervals of Δt, typically a sequence of measured values,
 x(k+1)=a corresponding smoothed signal,
 τ=an average time interval parameter which determines a degree of smoothing.

6. The method in accordance with claim 5, wherein for smoothing the signals yielded by the exhaust gas measurement system with a scanning time of 0.3 to 0.5 seconds, which serve to form different specific support signals and control signals, the following filtering method is used:

$$x(k+1) = ax(k) + (1-a)u(k), \text{ where } k=0, 1, 2$$

wherein
 x(k)=smoothed signal "x" at time k
 x(k+1)=smoothed signal "x" at time k+1
 u(k)=measured signal "x" at time k
and
 a: parameter=N/(N+1) a∈[0, 1]
 1−a: parameter=1/(N+1)
 N: number of signal values scanned during the smoothing procedure.

* * * * *